United States Patent

Bauer et al.

Patent Number: 6,024,477
Date of Patent: Feb. 15, 2000

[54] PROCESS AND DEVICE FOR AN ACCELERATED EXECUTION OF A PROGRAM USING A STORED-PROGRAM CONTROLLER

[75] Inventors: Kurt Bauer, Ostfildern; Franz Riedmueller, Markgroeningen; Hans-Peter Bartenschlager, Stuttgart; Thomas Jost, Remseck, all of Germany

[73] Assignee: Robert Bosch GmbH, Stuttgart, Germany

[21] Appl. No.: 08/918,764

[22] Filed: Aug. 25, 1997

[30] Foreign Application Priority Data

Aug. 24, 1996 [DE] Germany ............ 196 34 279

[51] Int. Cl.⁷ .................................................. G05B 15/00
[52] U.S. Cl. ........................... 364/132; 364/138; 364/146
[58] Field of Search ................................. 395/595, 596, 395/598; 364/146, 138, 132; 712/245, 246, 248

[56] References Cited

U.S. PATENT DOCUMENTS

| | | | |
|---|---|---|---|
| 4,047,003 | 9/1977 | La Rocca et al. | 364/138 |
| 5,231,747 | 8/1993 | Clark et al. | 29/243.53 |
| 5,285,376 | 2/1994 | Stuger | 364/147 |

FOREIGN PATENT DOCUMENTS

| | | |
|---|---|---|
| 0 608 762 | 8/1994 | European Pat. Off. . |
| 0 640 901 | 3/1995 | European Pat. Off. . |
| 37 43 438 | 6/1989 | Germany . |
| 41 42 517 | 6/1993 | Germany . |
| 42 26 456 | 2/1994 | Germany . |

*Primary Examiner*—Meng-Ai T. An
*Assistant Examiner*—Mackly Monestime
*Attorney, Agent, or Firm*—Kenyon & Kenyon

[57] ABSTRACT

A process and a device for accelerated execution of a program by a stored-program controller (SPC) on a machine. The machine has actuators actuated by the SPC to perform machine actions and sensors to output machine status signals. According to the process, the subsequent actuator action is triggered independently of whether the machine action caused by the previous actuator triggering has been completed. For this purpose, a status evaluation device is connected between the SPC and the machine, which receives the actuator triggering signals and the status signals output by the machine, and which generates therefrom an acknowledge signal indicating the completion of a machine action caused by actuator triggering; the acknowledge signal is supplied to the SPC as feedback signals describing the machine.

7 Claims, 3 Drawing Sheets

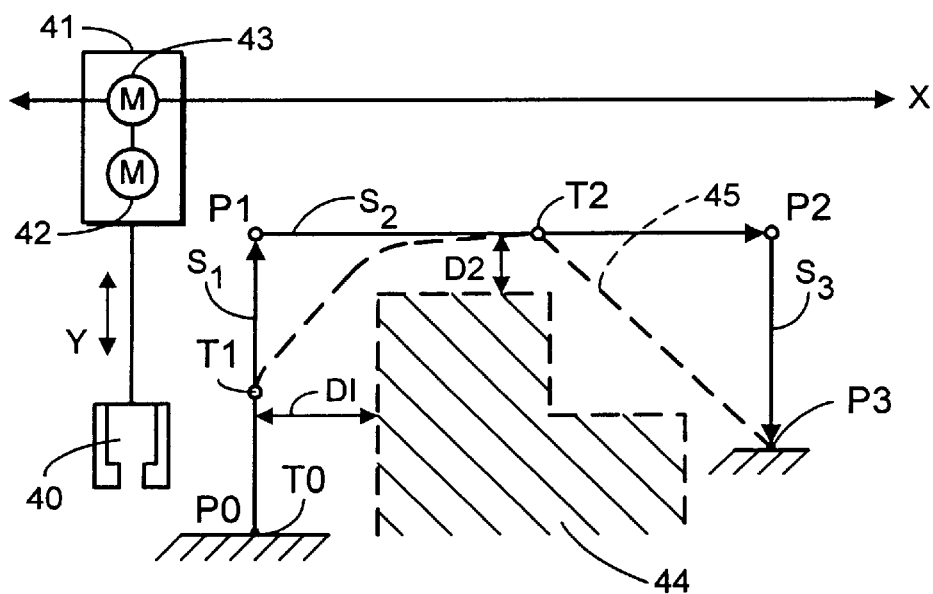
FIG. 2
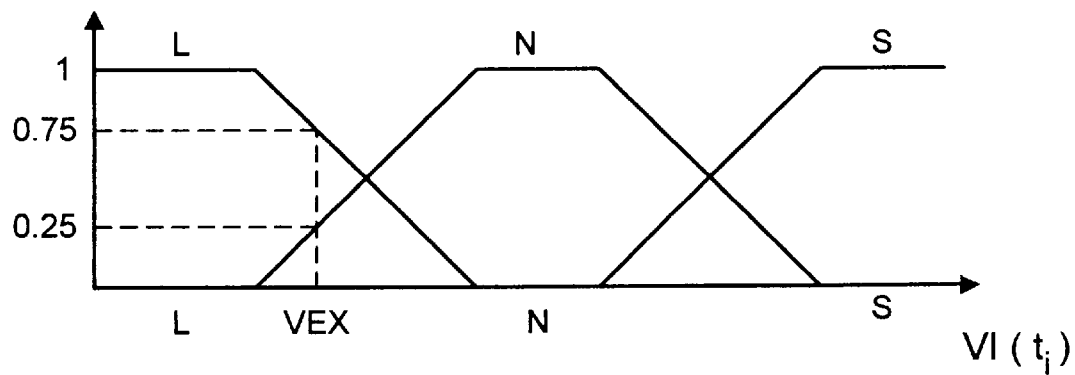
FIG. 3
FIG. 4

PROCESS AND DEVICE FOR AN ACCELERATED EXECUTION OF A PROGRAM USING A STORED-PROGRAM CONTROLLER

FIELD OF THE INVENTION

The present invention relates to a process and device for an accelerated execution of a program using a stored-program controller (SPC) used for controlling a plurality of industrial processes.

BACKGROUND INFORMATION

The principle of a conventional SPC always involves the combining of the status signals with the control signals and outputting the control signals to actuators assigned to the machine. The status of the machine is changed as a result of the action of the actuator. Sensors mounted on the machine recognize the current status and report this status back to the SPC in the form of the status signals corresponding to the logical values 0 and 1. In the SPC the feedback signals are combined logically with new control signals according to the SPC program. The feedback signals are combined strictly in sequence. A subsequent machine function according to the SPC program can only be executed when the previous function has been completed and the corresponding sensor has sent back an acknowledge signal confirming the completion to the SPC. For example, a tool carriage moves between two points driven by two drives acting at right angles to one another; the first drive is activated first, it sends an acknowledge signal to the SPC when the end position of the motion part assigned to it is reached, whereafter the second drive is activated to perform a perpendicular motion component assigned thereto. An unavoidable result of the strictly sequential execution of the actuator actions is usually a complicated and time-consuming machine operation.

SUMMARY OF THE INVENTION

One of the objects of the present invention is to accelerate the machine operation. This object is achieved using a process and a device according to the present invention. This process allows function sequences whose consecutive execution requires an acknowledge signal confirming the completion of the last function to overlap. As compared to a sequential execution, noticeable time savings are achieved. A further advantage of the process according to the present invention is that it can be implemented using a conventional SPC and can be retrofitted on existing systems. Neither the SPC, the sensors, nor the actuators used need to be modified.

BRIEF DESCRIPTION OF THE INVENTION

FIG. 2 shows a handling system with possible motion sequences according to the present invention.

FIG. 3 shows a relation assigning the speed to a set of linguistic variables.

FIG. 4 shows an evaluation table.

DETAILED DESCRIPTION OF THE INVENTION

Figure 1:
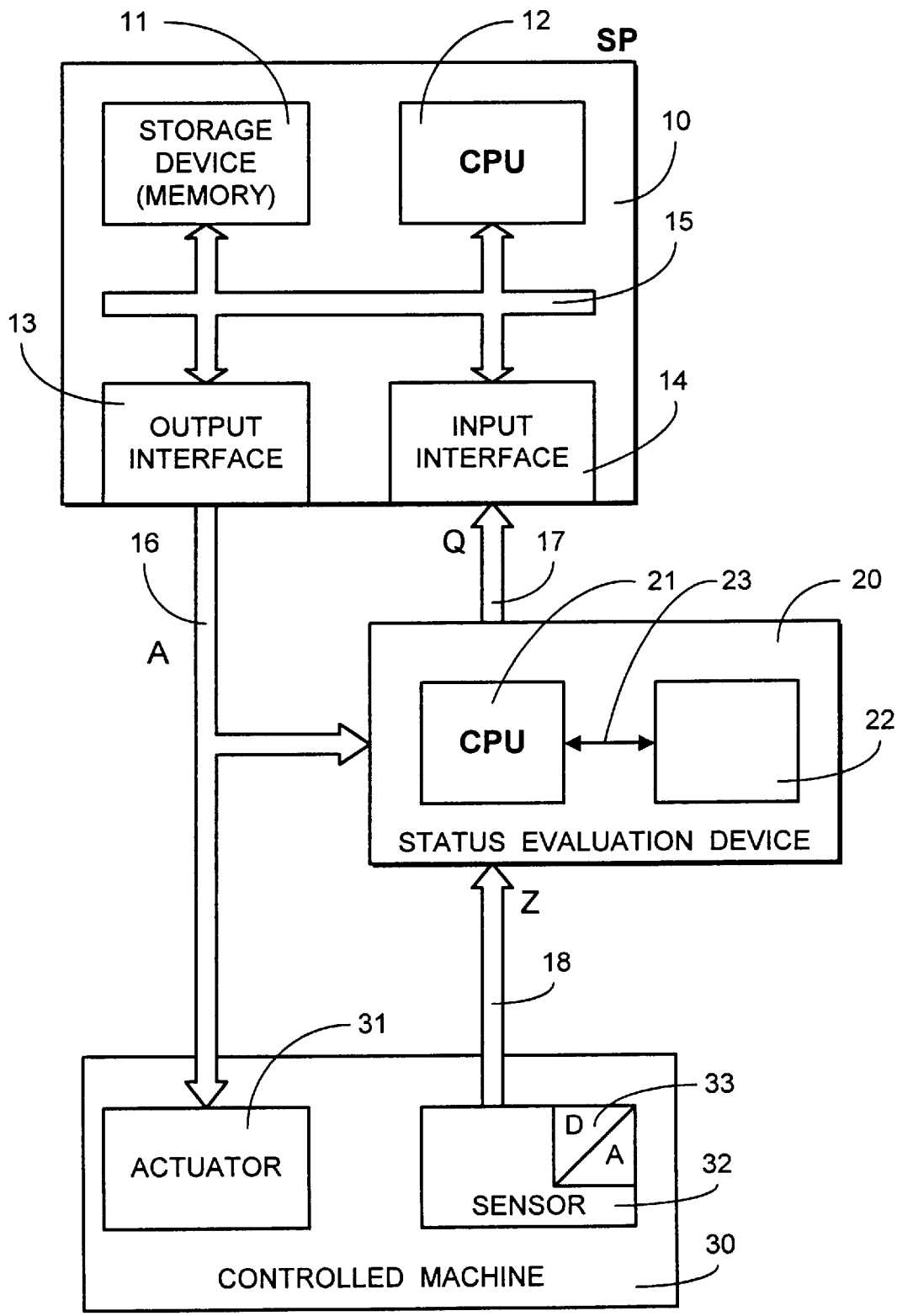
FIG. 1 shows a configuration including a stored-program controller with a controlled machine and status evaluation device according to the present invention.

FIG. 1 shows a block diagram of a control configuration designed to execute the process according to the present invention. This configuration includes a conventional stored-program controller (SPC) 10, which includes an input interface 14 receiving (through a conductor system 17) digital signals Z describing the status of a controlled machine 30, an output interface 13 through which actuation signals A for triggering the actuators 31 assigned machine 30 are output, a memory 11 containing a program for controlling machine 30, a central processing unit (CPU) 12 combining status signals Z entering via input interface 14 according to the program stored in memory 11 and sending the results to output interface 13, and a data bus connecting elements 11 through 14 for carrying out the data exchange between elements 11 through 14. SPC 10 is often connected to a higher-level numerical control (NC) (not illustrated) via an extension of data bus 15.

A machine 30 to be controlled is connected to output interface 13 of SPC 10 via a conductor system 16. Any industrial process that can be controlled by an SPC can be defined as a "machine" in addition to, e.g., machine tools, robots or handling systems, and the like.

Machine 30 is actuated by actuators 31 arranged in or on machine 30 and acting upon it. Such actuators 31 are, for example, valves, motors, or switches. Machine 30 also has sensors 32, which generate signals Z that describe the status of the machine. Customary sensors include switches or sensors for measuring temperature, pressure, or speed. If the status signals Z are present in analog form, they are converted to a digital form for digital processing by SPC 10. For this purpose, an analog-digital converter 33 can be connected to machine 30 immediately upstream from sensors 32.

Status signals Z of machine-side sensors 32 are sent to a status evaluation device 20 via a conductor system 18. This status evaluation device 20 includes a central processing unit (CPU) 21 for evaluating the incoming signals Z, and a memory 22 connected to CPU 21 via a conductor 23. Memory 22 includes a control mechanism, e.g., a program, according to which the status signals are evaluated. In addition to status signals Z, actuator triggering signals A are also supplied to status evaluation device 20 by the SPC-side output interface 13. The output of status evaluation device 20 is connected to input interface 14 of SPC 10 via a conductor system 17, through which status evaluation device 20 sends acknowledge signals Q to the SPC 10. The function of the arrangement shown in FIG. 1 is described below with respect to FIGS. 2 through 4. Thus, FIG. 2 shows a machine 30 in the form of a handling system, including a gripper 40, a motion device 41 with two actuators 42, 43 (e.g., pneumatic cylinders or motors) which cause arrangement 40, 41 to move along two orthogonal motion axes X, Y. Handling device (gripper and motion device) 40, 41 is to move from point P0 around an obstacle 44 to point P3.

When this motion task is executed using a conventional SPC, corner points P1 and P2 would yield a right-angled motion path as shown in FIG. 2. Gripper 40 first moves, controlled by actuator 42, which controls the motion along the Y axis, from point P0 to point P1. Actuator 43 acting along the X direction cannot be activated due to obstacle 44. Actuator 43 acting in the X direction can only be activated when the gripper has reached position P1 and a corresponding position sensor has sent an acknowledge signal to the SPC, which functions as a condition for activating the subsequent operation of actuator 43. After actuator 43 (acting in the X direction) is activated, actuator 42 (acting in the Y direction) cannot be actuated (in the opposite direction) also because of obstacle 44. This only becomes possible when a position sensor measuring the motion along the X axis detects that position P2 has been reached and sends an acknowledge signal Q, which functions as a condition for switching, to SPC 10.

According to the process of to the present invention, the status signals Z issued by sensors 32 no longer act as acknowledge signals or conditions for switching. Rather, the conditions for switching are evaluated by status evaluation device 20 as a function of actuator triggering signals A and status signals Z, and output to the SPC 10, independently of the completion of the function initiated by the last actuator triggering. For this purpose, a list with the sequence for outputting actuator triggering signals A is stored in memory 22 of status evaluation device 20. The list determines the time of the next actuator triggering in relation to the time T(A) of a current actuator triggering. Depending on the last actuator triggering signal A output by SPC 10 and the presence of the required status signals Z, status evaluation device 20 sends an acknowledge signal Q to input interface 14 of SPC 10, depending on the corresponding progress of time $t_{intern}$ running internally, according to the respective entry in the sequence list, thereafter SPC 10 triggers the next actuator action.

The time sequence list serving as a basis of this process is established prior to starting the machine. Time t(S) required for executing each machine action S within the control task is determined in test runs and/or on the basis of the machine's dynamic characteristics. As shown in FIG. 2, the time $T_1$ for moving gripper 40 along segment $S_1$ between points P0 and P1, time $T_2$ for moving gripper 40 along segment $S_2$ between points P1 and P2, as well as time $T_3$ for moving the gripper along segment $S_3$ between points P2 and P3 are determined. The average motion speeds $v_1$, $v_2$, $v_3$ are derived as a function of a system parameter describing the machine action (segments $S_1$, $S_2$, $S_3$ shown in FIG. 2). The geometry of obstacle 44 is also used to determine time $T_1$ for switching on actuator 43 acting in the X direction. Assuming that obstacle 44 has a distance D1 from segment $S_1$ linking points P0 and P1 and a distance D2 from segment $S_2$ linking points P1 and P2, and assuming the geometry of obstacle 44 is known, the earliest possible time $T_1$ for switching to actuate actuator 43 can be determined as follows:

$$T_1 = T_0 + D1/v_2,$$

where $T_0$ is the time for switching on actuator 42 acting in the direction Y at point P0. However, due to the possibility of variations in the speed of the individual motions, a safety time interval TS, which depends on the expected range of variation of the overlapping individual actions, should also be taken into account for the actual switching time $T_1$. The range of variation for each individual action $S_i$ is determined from measurements, from previous action, and by accounting for the expected environmental influences such as variations in temperature and pressure. Taking into consideration the safety time interval $TS_2$ that is appropriate for the overlapping of the next machine action, the time of triggering $T_1$ is expediently determined as follows:

$$T_1 = T_0 + D1/v_2 + TS_2,$$

i.e., by adding the overlap time $D1/v_2 + TS_2$ to the previous switching time $T_0$. Similarly, the switching time $T_2$ for triggering again actuator 42 acting in the direction Y, by accounting for the geometry of obstacle 44, is determined as follows:

$$T_2 = T_1 + D2/v_3 + TS_3,$$

where $TS_2$ is the appropriate safety time interval for this machine action, and $D2/v_3 + TS_3$ is the overlap time.

In the example shown in FIG. 2, motion path 45, drawn as a dashed line, is obtained for gripper 40 with the triggering times $T_1$, $T_2$ determined as described above. The motions caused by actuators 42 and 43 partially overlap.

With the shorter total motion segments, a shorter total motion time is obtained compared to the sequential execution of the individual motion segments through points P0, P1, P2, and P3.

For longer machine operation times with a high number of repeated cycles, changing operating conditions, for example, in relation to pressure, temperature, and wear phenomena, can cause a change in the machine characteristics, which in turn may cause a change in the times $T_i$ (I=1, 2, 3, . . . ) required for executing the individual machine actions.

As a result, if the actuator triggering signal output times Ti, determined prior to starting the machine, are maintained unchanged, erroneous operating states (in particular, collisions with obstacles) may occur. To avoid such a possibility, status evaluation device 20 continuously determines the function times $t_i(S_i)$ required for executing the machine actions $S_i$. After completing the execution of a machine action $S_i$, status evaluation device 20 recalculates (as a function of time $t_i$ for executing an action) the respective output time $T_i$ for the actuator triggering signal $A_i$ in the next SPC cycle in the case of repeated execution of the same machine action $S_1$. The recalculation can take place similarly to the determination of the output times $T_i$ by recalculating the average speeds $v_i$ according to the measured function times $T_i$ and thus the respective overlap times $S_i/t_i + TS_i$.

Another option for recalculating the output times $T_i$ for the actuator triggering signals $A_i$ according to the present invention provides for the use of the principles of fuzzy logic. In this case, the function time $T_1$ measured for each machine function $S_i$, is assigned to linguistic values using a association function normalized to 1. In the example as shown in FIG. 2, the average speed $v_i$ combined with function time $T_i$ over the respective segment $S_i$ is initially assigned to the linguistic values slow (=L), normal (=N), and fast (=S). FIG. 3 shows an example of such assignment. Approximately 25% of speed VEX shown as an example is assigned to the linguistic value N, and 75% is assigned to the linguistic value L. The linguistic values L, N, S for function times $T_i$ are combined with the actions of the machine actions (in the example shown in FIG. 2, the motion along segments $S_i$) with the aid of a control mechanism. FIG. 4 shows, in the form of an assignment of linguistic values L, N, S to segments $S_i$, an example of a possible control mechanism according to the present invention, which is to be read as follows: If speed $v_1$ on segment $S_1$ is slow (=L), then the next actuator triggering during the next cycle should occur late (=Sp) in relation to the normal run; if speed $v_1$ on segment $S_1$ is normal (=N) then the next actuator triggering during the next cycle should occur without change, i.e., normally (=N); if speed $v_1$ on segment $S_1$ is fast (=S), then the next actuator triggering during the next cycle should occur early (=Fr) in relation to the normal run. The suggestions for output time $T_i$ of the subsequent actuator triggering signal $A_i$ in the next cycle run, obtained with the help of the control mechanism, are then weighted as a function of the speeds $v_i$ determined with the linguistic values. In the example shown in FIG. 3, the following suggestion is obtained for output time $T_{VEX}$ in the next cycle for the speed shown VEX: $T_{VEX}$=75% late (Sp)+25% normal (N). By suitably evaluating these suggested values, the output time $T_{VEX}$ for the next cycle is determined. Appropriate evaluation procedures, converting the suggested linguistic values into executable numerical values, are known to the person of ordinary skill in the art and will therefore not be explained in detail here.

The analysis and/or also the control mechanism illustrated in FIG. 4 can also lead to association functions like the one illustrated in FIG. 3. To obtain a specific time value, "defuzzification" is needed in this case. Similar methods, such as the Center of Gravity (COG) method, are known to the person of ordinary skill in the art and are not explained in detail here; the same holds true for the selection of the suitable method for each case.

Figure 5:
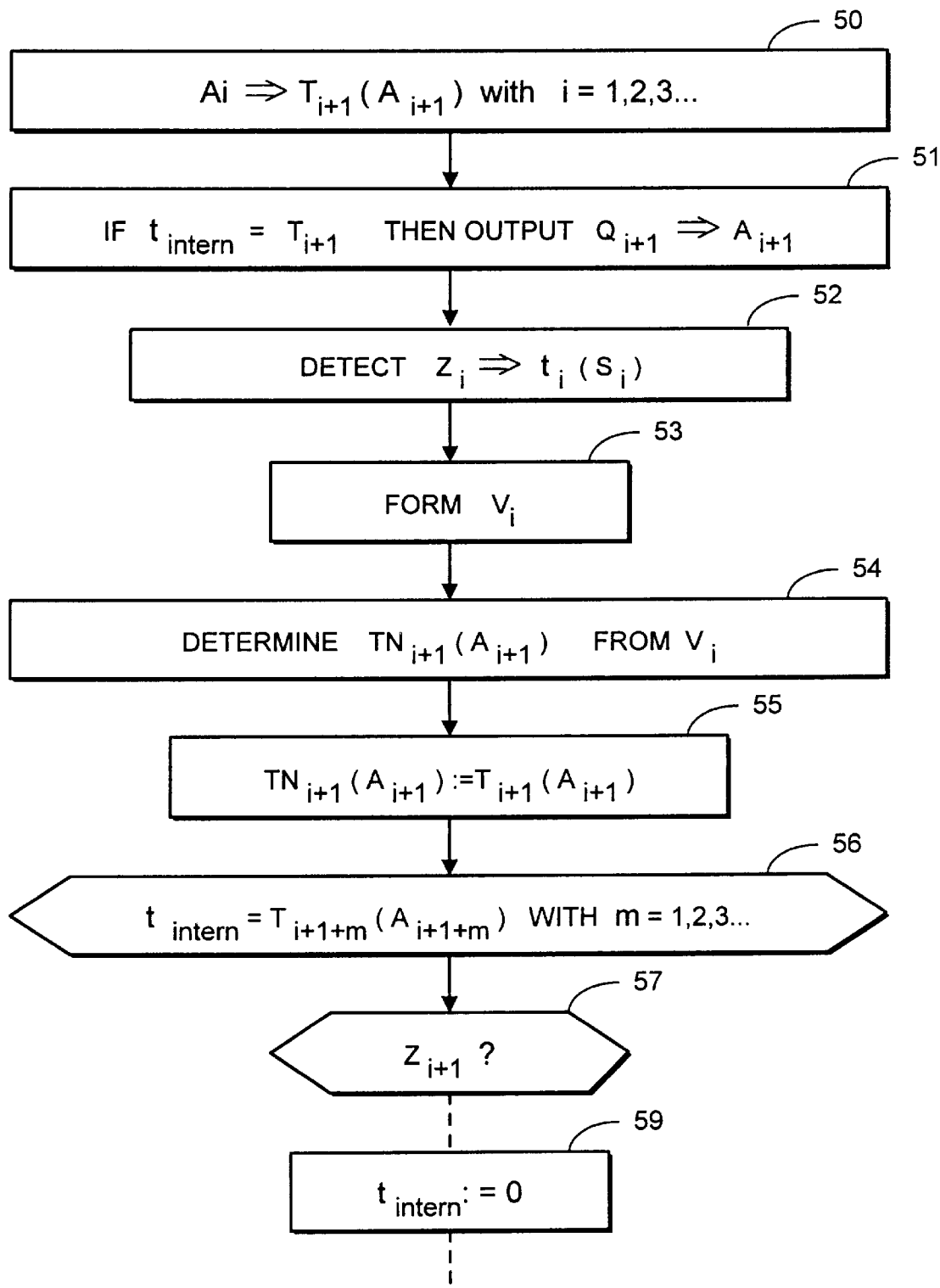
FIG. 5 shows a flow diagram according to the present invention.

FIG. 5 shows (to illustrate the operation of status evaluation device 20) a block diagram with a possible operating sequence. In step 50, the operating sequence is initiated with the output of an actuator triggering signal $A_i$ by SPC 10 to machine-side actuators 31. Actuator triggering signal $A_i$ is, as shown in FIG. 1, also detected by CPU 21 of status evaluation device 20 via signal connection 16 provided for this purpose. This status evaluation device assigns the actuator triggering signal, according to the time sequence table stored in memory 22, to an output time $T_{i+1}$ for the output of the following actuator triggering signal $A_{i+1}$. An internal time $t_{intern}$ runs within status evaluation device 20 as a reference basis for the output times $T_{i+1}$; the internal time $t_{intern}$ is advantageously reset to zero after the completion of each program cycle, for example, at the beginning of the following cycle (step 59). If $t_{intern}$ corresponds to output time $T_{i+1}$ ($A_{i+1}$), status evaluation device 20 sends an acknowledge signal $Q_1$ to SPC 10, confirming to the machine the completion of machine action $S_i$ triggered by the respective actuator triggering signal $A_i$, independently of its actual status. SPC 10 then outputs the following actuator triggering signal $A_{i+1}$, which is again supplied to status evaluation device 20. Status evaluation device 20 then verifies continuously whether the machine action initiated by actuator triggering signal $A_i$ is actually completed, and the respective function time $t_i$ is present. This is done, as indicated in step 52, on the basis of a status signal $Z_i$ output by one of machine-side sensors 32, which confirms the actual completion of the corresponding machine action $S_i$. The example shown in FIG. 2 provides that actuator 42 would output a status signal confirming the completion of a motion action if displacement in the Y direction for traveling the path from P0 to P1 is completed. Status evaluation device 20 forms, with the aid of machine function time $T_i$, machine speed $v_i$ obtained for the execution of the respective action $S_i$ (step 53). By combining the speed value obtained $v_i$ with the machine action executed $S_i$ and evaluating with the aid of a rule base as shown in FIGS. 3 and 4, status evaluation device 20 determines a new output time $TN_{i+1}$ ($A_{i+1}$), which is confirmed in the next cycle by the output of actuator triggering signal $A_i$ (step 54). Status evaluation device 20 receives the new switching time $TN_{i+1}$ ($A_{i+1}$) into its memory 22 as a new output time $T_{i+1}$ (step 55). If the SPC cycle is repeated, the new value stored $T_{i+1}$ determines the time of output for the following actuator triggering signal $A_{i+1}$. An actuator triggering signal $A_i$ can also determine a plurality of successive actuator triggering signals $A_{i-n}$, with n=1, 2, 3, . . . . Status evaluation device 20 checks (after the output time $T_{i+1}$ has been recalculated) whether the internal time running at the same time $t_{intern}$ corresponds to the following output time $T_{i+2}$ determined by actuator triggering signal $A_i$, step 56. If so, step 51 is repeated. If the output of the following actuator triggering signal $A_{i+1}$ is not yet present, status evaluation device 20 checks whether a status signal $Z_i$ confirming the completion of a machine action is present. If such a signal is present, status evaluation device 20 executes steps 52 through 55.

Although status evaluation device 20 was only described in the context of the execution of a spatial motion, it is not limited to such applications. Mass flows in pipelines or chemical reactions can also be overlapped according to the same principle. Without extending beyond the proposed concept, the SPC 10 and the machine 30, with its respective actuators 31, 32, can be configured in a broad range, and even differently from the configuration illustrated in FIG. 1. The same holds true for the updating of the output times, for example, regarding the underlying rule base, with regard to the type and assignment to linguistic values and defuzzification. The program sequence proposed for the operation of status evaluation device 20 should also be regarded for purposes of an example only. It is normally adapted to the specific task at hand and may differ from the sequence shown in FIG. 5.

What is claimed is:

1. A process for an accelerated execution of a program using a stored-program controller (SPC) on a machine, the machine including sensors for outputting machine status signals, comprising the steps of:

initiating a first machine action by triggering at least one actuator of the machine using the SPC by a first actuator triggering signal;

after the step of initiating the first machine action, initiating a second machine action by a second actuator triggering signal independently of whether the first machine action has been completed; and determining a first output time of the second actuator triggering signal as a function of a first output time of the first actuator triggering signal.

2. The process according to claim 1, further comprising the step of:

determining a second output time of the second actuator triggering signal by adding an overlap time to the first output time of the first actuator triggering signal.

3. The process according to claim 1, further comprising the step of:

determining the first output time of the first actuator triggering signal in a SPC cycle for a subsequent SPC cycle.

4. The process according to claim 3, further comprising the step of:

determining a time for performing the first machine action initiated by the first actuator triggering to determine a further actuator triggering signal for the subsequent SPC cycle.

5. The process according to claim 4, further comprising the step of:

combining a further parameter corresponding to the time with a system parameter corresponding to the first machine action, the further parameter and the system parameter being combined according to a rule provided by a knowledge base system to continuously determine the first actuator triggering signal.

6. A process for an accelerated execution of a program using a stored-program controller (SPC) on a machine, the machine including sensors for outputting machine status signals, comprising the steps of:

initiating a first machine action by triggering at least one actuator of the machine using the SPC, the first machine action being initiated by a first actuator triggering signal;

after the step of initiating the first machine action, initiating a second machine action independently of whether the first machine action has been completed, the second machine action being initiated by a second actuator triggering signal;

determining a first output time of the second actuator triggering signal as a function of a first output time of the first actuator triggering signal;

determining a chronological order of the first actuator triggering signal using a chronological sequence list; and storing the chronological order.

7. A device for controlling a machine, comprising:

a stored-program controller (SPC) controlling the machine and cyclically combining feedback signals corresponding to the machine to form control signals, the SPC generating actuator triggering signals, the machine generating status signals;

actuators situated in the machine and receiving the control signals for initiating a machine action; and a status evaluation device coupled between the SPC and the machine, the status evaluation device receiving the actuator triggering signals and the status signals, and generating acknowledgment signals indicative of a completion of the machine action initiated by the actuators, the status evaluation device including a memory device storing a list having a temporal sequence for outputting the actuator triggering signals, wherein the acknowledgment signals are provided to the SPC as the feedback signals corresponding to the machine.

* * * * *

UNITED STATES PATENT AND TRADEMARK OFFICE
CERTIFICATE OF CORRECTION

PATENT NO.    : 6,024,477
DATED         : February 15, 2000
INVENTOR(S)   : Portney It is certified that error appears in the above-identified patent and that said Letters Patent is hereby corrected as shown below:

Column 10,
Lines 4, 12 and 15, "focussing" should be -- focusing --.

Column 12,
Line 5, "chances" should be -- changes --.

Signed and Sealed this

Twenty-fourth Day of June, 2003

JAMES E. ROGAN
*Director of the United States Patent and Trademark Office*